United States Patent Office 3,039,637
Patented June 19, 1962

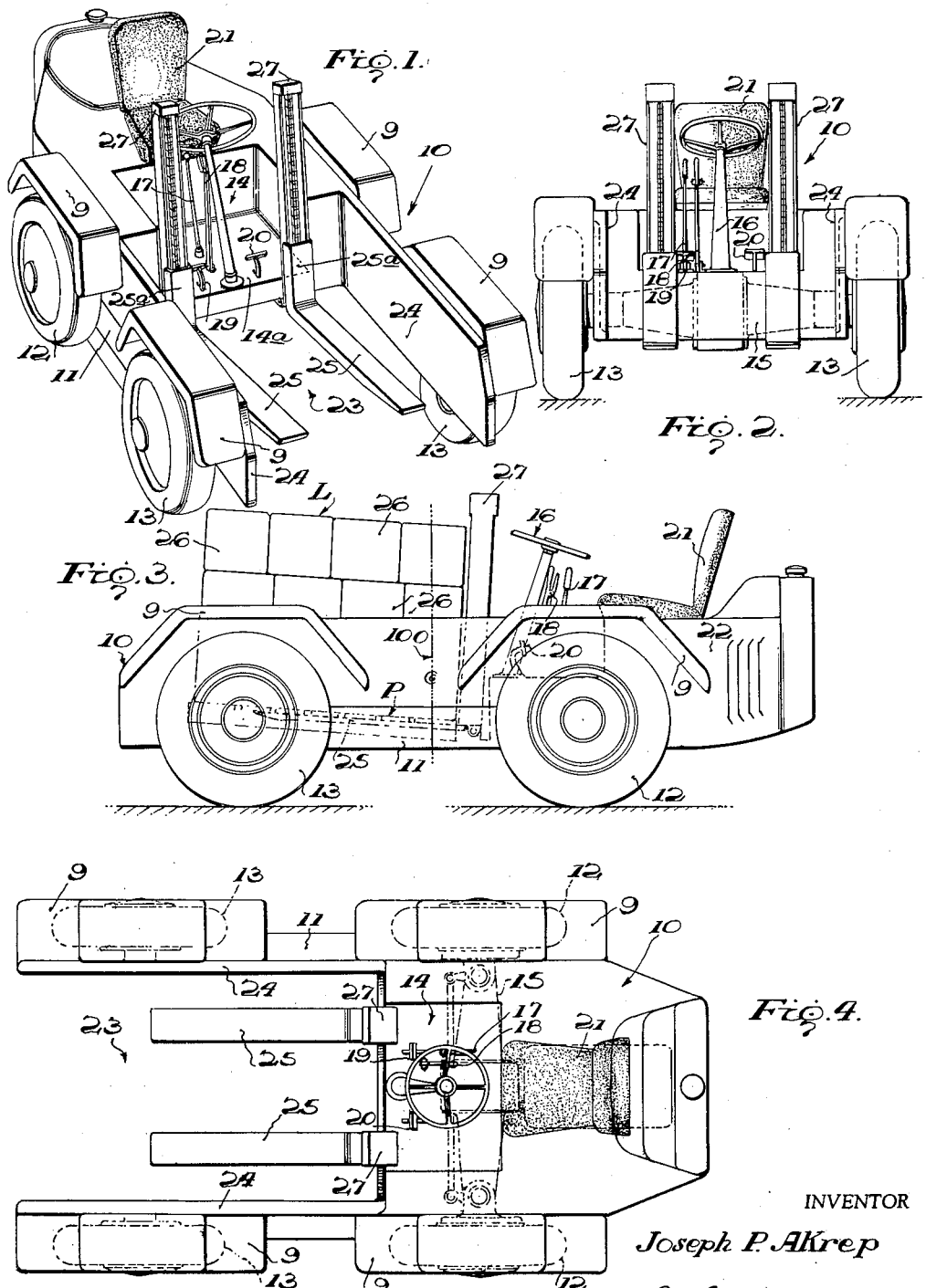

3,039,637
ROADABLE UNIT LOAD CARRIER
Joseph P. Akrep, Bridgeview, Oak Lawn, Ill.
Filed Mar. 10, 1959, Ser. No. 798,565
1 Claim. (Cl. 214—670)
(Granted under Title 35, U.S. Code (1952), sec. 266)

The invention described herein, if patented, may be manufactured and used by or for the Government for governmental purposes, without the payment to me of any royalty thereon.

The present invention relates to a Roadable Unit Load Carrier designed particularly, although not exclusively, for picking up, transporting and depositing, palletized loads of materiel in the field.

One of the objects of the present invention is to provide a new and improved vehicle as aforesaid which is capable of transporting loads over rough terrain and one which combines some of the functions of both a fork lift truck and a so-called straddle carry truck, whereby a single improved carrier, or vehicle, serves the purpose of the two.

Airborne materiel is delivered by parachute to various field locations for dispersion and use by military personnel located there, such materiel being palletized. Often the terrain in the field locations is uneven, even rugged, and in order to rapidly and safely disperse the palletized load, or loads, a special kind of motorized vehicle, or carrier, is required. Fork lift trucks of known types are not suitable for rapid movement over rough terrain; nor are the straddle carry trucks capable of travel over uneven ground surfaces.

In addition to providing an improved vehicle of the foregoing character, another object of the invention is to provide one whose overall weight is drastically reduced, thus being more suitable for airborne delivery by the Armed Forces; another object being to provide such a vehicle which has none of the disadvantages of conventional fork lift trucks such, for example, as variable ground pressure and instability which are inherent in such conventional fork lift trucks; said improved vehicle having, in fact, symmetrical ground pressure distribution and thus increased stability, safety, and being capable of higher speeds with good control and with virtually no tendency to overturn while travelling at such higher speeds over uneven and rough terrain.

A further object of the present invention is the provision of a load carrier capable of handling palletized unit loads rather than by normal man-handling of individual pieces, as is presently done in forward military areas during maneuvers, or campaigns, thus effecting a substantial reduction in manpower.

Other objects of the invention are to provide a new and improved lightweight vehicle, or load carrier of small size, having a low silhouette, low fuel consumption, and adaptability to combat units, and one which provides a unit load capability not presently available to military field units ranging in size from corps and division down to units of company size.

The foregoing and other objects and advantages of the present invention will be apparent from the following description and appended claims when considered in conjunction with the accompanying drawing forming a part of this specification, wherein like reference characters designate corresponding parts in the several views.

In said drawing:

FIG. 1 is a perspective view of the improved vehicle or unit load carrier of the present invention;

FIG. 2 is a front elevational view of the same;

FIG. 3 is a left side elevation of the vehicle of the foregoing views; and

FIG. 4 is a top plan view thereof.

With reference now particularly to the drawing, the improved vehicle or load carrier of the present invention is shown as a whole at 10. It has a frame 11, a pair of rear axle-supported steerable wheels 12, 12 and a pair of front independently mounted wheels 13, 13. Power may be applied to the rear wheels only or, if desired, also to the front wheels. It is important at this point to note that, whereas the vehicle 10 has been shown and described herein as being provided with supporting and traction-producing means in the form of wheels, endless track assemblies may be substituted therefor within the spirit and scope of the present invention. Such endless track assemblies would be of conventional type and structure, either half track or full track and thus need not be illustrated in the accompanying drawing.

The vehicle has an operator's compartment or station shown as a whole at 14, see FIGS. 1 and 4. This station is located over and partially fore and aft of the rear axle assembly 15, see FIGS. 3 and 4. Control means for the vehicle are disposed within the area of station 14 and comprise the usual steering column and wheel 16, gear shift lever 17, brake handlever 18, and clutch and brake pedals 19 and 20, respectively. A seat 21 for the operator is disposed above an engine compartment 22. The space or station 14 has a floor 14a above which the several control members 16, 17, 18, 19, and 20 extend, as clearly shown in FIG. 1. While not shown, suitable conventional control means are also provided for lifting and for tilting the forks of the vehicle.

Whereas the compartment or operator's station 14 provides the inner end or side of a so-called "load well," or rectangular open top and bototm space 23, the well or space 23 is defined on opposite parallel sides by widely spaced forwardly extending guide members or plates 24 which are secured to the frame 11 in any suitable manner, as by welding.

The load carrier 10 includes a pair of conventional power-operated inboard lifting and tilting fork tines or forks 25, 25 for engagement with, and the lifting and lowering of, a unitary load, such as the palletized load L consisting of individual units or packages 26, stacked on a pallet P.

Suitable mechanism is provided for raising, lowering, and tilting the fork tines 25, 25, said mechanism being associated with upright masts 27, 27 disposed in advance of the floor 14a of the operator's station.

As seen in FIGURES 3 and 4, the forward ends of the fork tines 25, 25, as well as the load L, are spaced a substantial distance inward or rearward from the front ends of the parallel guide members 24, 24. Thus, the open-top well or space 23 (FIGURE 4) which, as stated above, is framed on three of its sides, affords protection for the fork tines, and also against shifting of a load, as well as to negative the possibility of loss of a loaded pallet, such as that shown in FIGURE 3. Moreover, it will be apparent from FIGURE 3 that the center of gravity of the vehicle, or carrier of the present invention, when empty, and the center of gravity of the load L itself, need not necessarily coincide. Actually, it is only necessary that the center of gravity of the combination, i.e., the load plus carrier, coincide approximately with the axis of symmetry with relation to the carrier wheels 12, 13, to assure approximate symmetrical ground pressure and thus achieve the near-perfect balancing of the carrier and its palleted load over varying contours of hazardous terrain.

The unit load carrier or vehicle 10 is so constructed and proportioned as to be capable of easy maneuverability even over rough terrain. Appropriate dimensions of the vehicle are: length, approximately 9 feet; width, approximately 6 feet; height to the top of the fenders 9, approximately 2½ feet; and height to the top of masts 27, approximately 3½ feet. The vehicle is capable of handling a standard palletized load L having dimensions of 43 inches in width, 52 inches in length, and a height of 54 inches. Such a load can be picked up by the forks 25, 25 and carried inboard within the rectangular space 23 between the plates, frame members, or guides 24, 24 at the approximate center of gravity of the vehicle, as represented by the vertical line 100 in FIG. 3 of the drawing.

By virtue of the fact that the load L is carried at the approximate center of gravity, as stated, and because of the novel configuration of the vehicle 10, overall, the load being carried is completely balanced through natural positioning, without the necessity for additional apparatus and mechanisms which are not only complicated but costly. Thus, a simplified mechanism and structure are capable of performing the pick-up, transporting, and discharging of the load. By eliminating the use of complicated mechanisms, danger of breakdown, jamming, or other malfunction is reduced to a minimum. Moreover, maintenance requirements are likewise minimized, and initial cost is materially reduced.

Previously known fork type lift trucks have been designed for and used in connection with warehousing load-stacking operations on smooth, level surfaces. Obviously, they are not suitable for military tactical field use, one of the principal uses of the vehicle or carrier 10 of the present invention.

The vehicle 10 is symmetrically balanced, which is superior in all respects for its intended principal use, namely, military tactical supply. Its novel structure provides additional benefits, such as full protection of the palletized load L against toppling and loss of the individual packages or units 26 under rough terrain conditions, improved roadability and safety, greater efficiency in use because of reduced military manpower requirements, and improved total tonnage handled. Moreover, the general purpose cargo vehicle 10, because of its relatively light weight and bulk, as compared to conventional fork type lift trucks, is air transportable and air droppable, permitting its use in all airborne and air-supplied operations.

While the advantages of the present novel vehicle for military operations in the field have been stressed, it is equally well adapted for various non-military uses.

After an airborne palletized load, such as load L of FIGURE 3, has reached the ground from an aircraft parachute dispersal, the vehicle 10 is moved into position to embrace or frame, on three of its sides, said load. The fork tines 25, 25 are moved under the pallet P as the guides 24, 24 are moved along the parallel sides of the load. The vehicle is propelled toward the load L until the inner, or adjacent, end thereof is engaged by the upturned inner ends 25a of the fork tines. The tines are then elevated to raise the load off the ground. In this condition, shown in FIG. 3, the load L is disposed at the approximate symmetrical center of gravity of vehicle 10, as indicated at 100 in this figure. Thus, the load is completely balanced and ready to be transported safely and rapidly to its chosen destination. At said destination, the forks 25 are lowered to "ground" the pallet P, and the vehicle 10 is backed off and propelled to a location to repeat, if required, the operation just described.

Obviously, the invention is not limited to the embodiments herein shown and described, but may assume other forms.

I claim:

A power-driven roadworthy fork lift unit load carrier for use in airlift, air-drop and palletized tactical operations, said carrier being so constructed, arranged, and proportioned as to move under its own power into position to surround a palletized load on three of its sides, said unit load carrier comprising a rigid frame and front and rear axle-supported pairs of wheels in which the wheels of at least the said rear axle-supported pair are steerable, an operator's station disposed in association with the frame located between the wheels of the rear pair overlying the rear axle and extending rearwardly beyond the same, said carrier also including a rear-disposed compartmented power plant located at and extending rearwardly of said operator's station which performs the dual function of supplying power to propel the carrier and at the same time, and together with said station, providing appropriately disposed heavy counterbalancing means to offset the inherent weight of a palletized load supported by the carrier forwardly thereof, said rigid frame including a pair of widely-spaced forwardly extending guide members defining the longitudinal sides of an open top rectangular space located forward of said operator's station and between the wheels of the said front pair of wheels and thus, together with said operator's station, serving to surround said open-top rectangular space on its two parallel longitudinal sides and at its inner end leaving only the outer end thereof open, and a pair of transversely spaced longitudinally extending power-operated inboard liftable and tiltable fork tines disposed at all times wholly within the overall area of said rectangular open-top space and having their forward ends located a substantial and protective distance inward from the forward ends of said guide members, an upright mast assembly disposed within said open-top rectangular space and immediately adjacent the forward end of said operator's station providing supporting means for said fork tines and operable to raise, lower, and/or tilt the same as desirable, said mast assembly and said fork tines deriving their operating power from said power plant, and said fork tines being so disposed as to position the supported palletized unit load at substantially the symmetrical center of gravity with relation to the front and rear wheel-supporting axles whereby the center of gravity of a fork-sustained palletized load when combined with said unit load carrier coincide approximately with the axis of symmetry in relation to the wheels to thereby assure approximate symmetrical ground pressure for stability and ease of operation and fast travel over irregular terrain.

References Cited in the file of this patent

UNITED STATES PATENTS

| | | |
|---|---|---|
| 1,985,285 | Erdahl | Dec. 25, 1934 |
| 2,492,608 | Wilms | Dec. 27, 1949 |
| 2,616,580 | Olson | Nov. 4, 1952 |

FOREIGN PATENTS

| | | |
|---|---|---|
| 1,093,804 | France | Nov. 24, 1954 |